Figure 2:
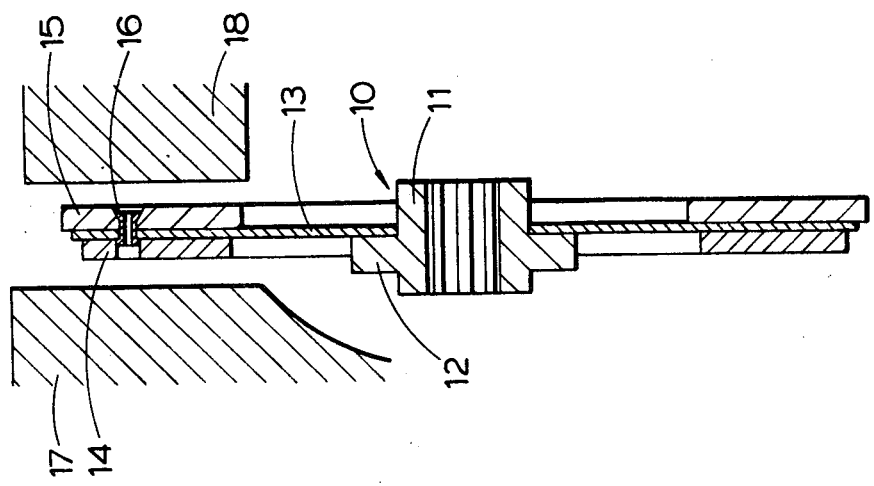

United States Patent [19]

Davies

[11] 4,270,640
[45] Jun. 2, 1981

[54] FRICTION CLUTCH DRIVEN PLATES

[75] Inventor: David A. Davies, Leamington Spa, England

[73] Assignee: Automotive Products Limited, Leamington Spa, England

[21] Appl. No.: 42,111

[22] Filed: May 24, 1979

[30] Foreign Application Priority Data

May 24, 1978 [GB] United Kingdom ............... 21998/78

[51] Int. Cl.³ .............................................. F16D 13/72
[52] U.S. Cl. .............................. 192/70.14; 192/107 R
[58] Field of Search ........... 192/70.14, 107 R, 107 M, 192/113 R; 188/71 S, 218 XL

[56] References Cited

U.S. PATENT DOCUMENTS

| 2,163,884 | 6/1939 | La Brie | 192/107 M X |
| 2,381,941 | 8/1945 | Wellman et al. | 192/113 R X |
| 3,042,168 | 7/1962 | Binder | 192/70.14 X |
| 3,213,986 | 10/1965 | Smirl | 192/113 R X |
| 3,335,837 | 8/1967 | Smith et al. | 192/113 R |
| 3,543,901 | 12/1970 | Lengsfeld et al. | 188/218 XL X |
| 3,717,230 | 2/1973 | Hartmann | 192/70.14 X |

Primary Examiner—Rodney H. Bonck
Attorney, Agent, or Firm—Kemon & Estabrook

[57] ABSTRACT

A clutch driven plate for releasable clamped engagement between opposed driving surfaces, usually an engine flywheel and a clutch cover pressure plate, is particularly suitable for a motor vehicle and includes the usual hub, friction facing carrier and annular coaxial friction facings. The friction facings are for a major part of both radially co-extensive, but the facing on one side of the carrier is of greater superficial area than the facing on the opposite side. This may be most simply achieved by making one facing of greater radial width than the other facing.

5 Claims, 2 Drawing Figures

FRICTION CLUTCH DRIVEN PLATES

This invention relates to dry plate clutch units, particularly though not exclusively used in motor vehicles for releasable driving engagement between the engine and transmission, the design and operation of clutch units of this type being well known in the art.

In clutch units of this type, co-axial annular friction facings of the same internal diameter and radial width are affixed to either side of a clutch driven plate, these facings being normally of identical axial thickness and type of friction material.

In operation the driven plate is sandwiched between the engine flywheel and clutch cover pressure plate. The heat generated at the interface of friction material and engine flywheel is conducted away from that interface more quickly than from the interface of friction material and pressure plate by virtue of the larger heat sink provided by the engine flywheel. This results in the thickness of friction material adjacent the pressure plate deteriorating at a greater rate than that adjacent the engine flywheel.

One method of compensating for this deterioration is to make the friction facing adjacent the pressure plate of greater axial thickness than that adjacent the engine flywheel. This method has the disadvantage that since the facings differ only slightly in thickness and are in other respects identical they may be accidentally interchanged in assembly. Further, in the case of riveted linings, the two lengths of rivet required may be easily transposed resulting in weak or loosely affixed linings.

Another method of equalising wear is to use facings of different friction material on either side of the pressure plate, but this has the disadvantage that the facings are again of the same size and of possibly similar appearance, moreover the different characteristics of the materials can lead to operational difficulties in less than ideal conditions of use.

The object of the present invention is to overcome the above disadvantage whilst providing a clutch driven plate of lower inertia and of more economical construction.

According to the invention there is provided a clutch driven plate for releasable clamped engagement between opposed driving surfaces and having on either side annular co-axial friction facings which are for a major part of both radially co-extensive, the facing on one side being of greater superficial area than the facing on the opposite side.

The opposed driving surfaces usually comprise an engine flywheel and a clutch cover pressure plate.

Preferably the facing on one side is simply of greater radial width than the facing on the other side.

Figure 1:
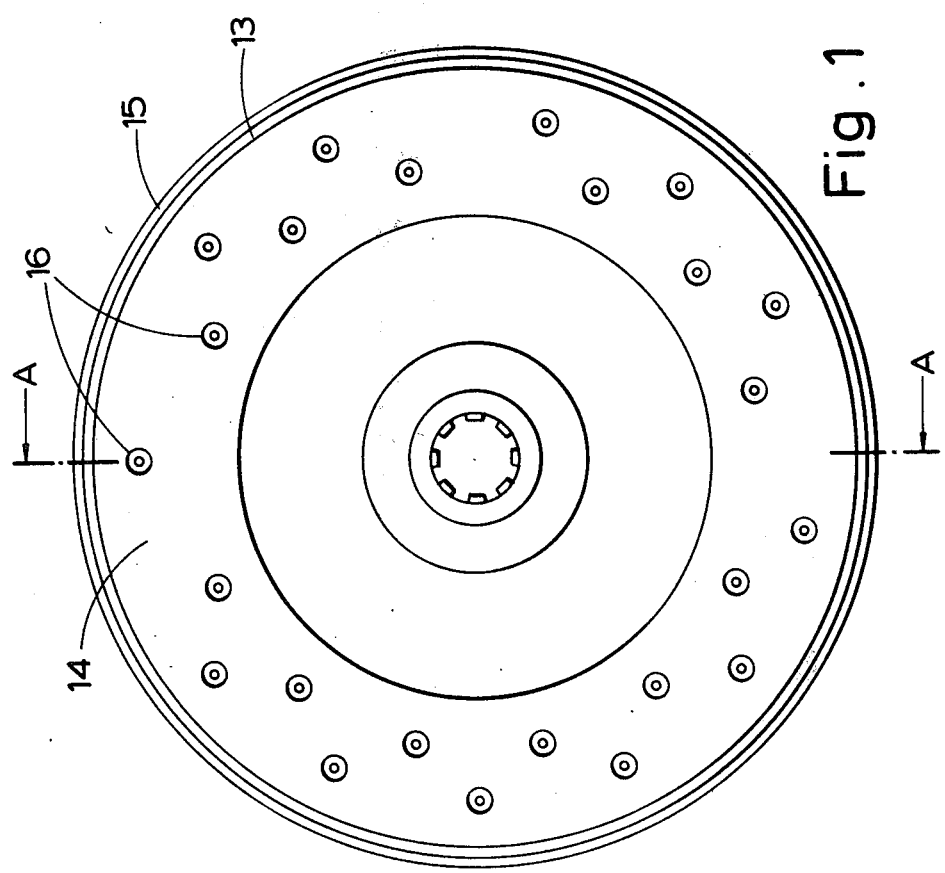

Other features of the invention are included in the following description of a preferred embodiment shown by way of example on the following drawing in which:

FIG. 1 is a diagrammatic plan view of a clutch driven plate according to the invention; and FIG. 2 is a diametral section on the line A—A through the clutch driven plate shown in FIG. 1.

The clutch driven plate is intended for use in a motor vehicle having a conventional dry plate clutch for releasable driving engagement between the engine and transmission. Since this invention is concerned only with the friction facings reference to other constructional features well known for clutch driven plates will be omitted.

FIGS. 1 and 2 show a driven plate 10 having an internally splined hub 11 with a radially extending flange 12 to which is riveted an annular disc member 13. Annular friction facings 14 and 15 are affixed to the disc member 13 towards its outer periphery by co-axial rows of rivets 16. The facings 14, 15 may alternatively be bonded to the member 13. The friction facing 14 adjacent the engine flywheel 17 is of less radial width than the friction facing 15 adjacent the clutch cover pressure plate 18. In other respects the friction facings 14 and 15 are identical.

In operation the driven plate 10 is clamped between the engine flywheel 17 and the pressure plate 18 in the normal manner.

It is desirable that the friction facings 14 and 15 are radially co-extensive for a major part of both to ensure that the thrust between the pressure plate 18 and engine flywheel 17 is transmitted in an axial direction without subjecting the driven plate 10 to any bending stress.

I claim:

1. A clutch driven plate for releasable clamped engagement between opposed driving surfaces and comprising:
   a clutch hub member;
   an annular friction facing carrier co-axial with and carried by the hub member;
   an engine flywheel side annular friction facing provided co-axially on one side of said carrier; and
   a clutch cover pressure plate side friction facing provided co-axially on the opposite side of said carrier, said friction facings being continuous annular rings for a major part of both radially co-extensive and said pressure plate side facing being a greater superficial area than said flywheel side facing.

2. A clutch driven plate according to claim 1, wherein said pressure plate side facing is of greater radial width than said flywheel side facing.

3. A clutch driven plate according to claim 2, wherein the narrower facing lies within the radial extent of the wider facing.

4. A clutch driven plate according to claim 1, wherein said friction facings are of the same axial thickness.

5. A clutch driven plate according to claim 1, wherein said friction facings are of the same material.

* * * * *

Dedication 4,270,640.—*David A. Davies,* Leamington SPA, United Kingdom. FRICTION CLUTCH DRIVEN PLATES. Patent dated June 2, 1981. Dedication filed Aug. 31, 1981, by the assignee, *Automotive Products Ltd.*

Hereby dedicates to the public the remaining portion of the term of said patent.

*[Official Gazette October 13, 1981.]*